United States Patent
Sakata et al.

(10) Patent No.: US 10,131,823 B2
(45) Date of Patent: Nov. 20, 2018

(54) POLYOLEFIN-BASED ADHESIVE COMPOSITION

(71) Applicant: TOYOBO CO., LTD., Osaka (JP)

(72) Inventors: Hideyuki Sakata, Hyogo (JP); Kenji Kashihara, Hyogo (JP); Takeshi Ito, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 86 days.

(21) Appl. No.: 15/316,945

(22) PCT Filed: Jun. 5, 2015

(86) PCT No.: PCT/JP2015/066334
§ 371 (c)(1),
(2) Date: Dec. 7, 2016

(87) PCT Pub. No.: WO2015/190411
PCT Pub. Date: Dec. 17, 2015

(65) Prior Publication Data
US 2017/0096586 A1    Apr. 6, 2017

(30) Foreign Application Priority Data

Jun. 11, 2014   (JP) ................................. 2014-120289
Jun. 11, 2014   (JP) ................................. 2014-120290

(51) Int. Cl.
| | |
|---|---|
| C08L 63/00 | (2006.01) |
| C09J 123/26 | (2006.01) |
| B32B 15/08 | (2006.01) |
| B32B 15/085 | (2006.01) |
| C09J 11/06 | (2006.01) |
| C09J 123/28 | (2006.01) |
| C09J 163/00 | (2006.01) |
| C08L 63/04 | (2006.01) |

(52) U.S. Cl.
CPC ............. *C09J 123/26* (2013.01); *B32B 15/08* (2013.01); *B32B 15/085* (2013.01); *C08L 63/00* (2013.01); *C08L 63/04* (2013.01); *C09J 11/06* (2013.01); *C09J 123/28* (2013.01); *C09J 163/00* (2013.01); *C08L 2201/56* (2013.01)

(58) Field of Classification Search
None
See application file for complete search history.

(56) References Cited

U.S. PATENT DOCUMENTS

| | | |
|---|---|---|
| 2016/0036013 A1 | 2/2016 | Nakazato et al. |
| 2017/0297302 A1* | 10/2017 | Okimura ................... B32B 7/12 |

FOREIGN PATENT DOCUMENTS

| | | |
|---|---|---|
| JP | 2-67386 | 3/1990 |
| JP | 9-176609 | 7/1997 |
| JP | 10-46122 | 2/1998 |
| JP | 10-60401 | 3/1998 |
| JP | 2003-261847 | 9/2003 |
| JP | 2006-307104 | 11/2006 |
| JP | 2009-292853 | 12/2009 |
| JP | 5700166 | 4/2015 |
| JP | WO 2016/047289 A1 * | 3/2016 |
| WO | 2015/033703 | 3/2015 |

OTHER PUBLICATIONS

International Search Report dated Aug. 11, 2015 in International (PCT) Application No. PCT/JP2015/066334.

* cited by examiner

*Primary Examiner* — Ana L. Woodward
(74) *Attorney, Agent, or Firm* — Wenderoth, Lind & Ponack, L.L.P.

(57) ABSTRACT

Provided is an adhesive composition comprising a modified polyolefin and an epoxy resin, the composition having excellent pot life, and excellent adhesion to both a metal substrate and a polyolefin resin substrate. The adhesive composition comprises a modified polyolefin (A), a glycidyl amine-type epoxy resin (B1), a glycidyl ether-type epoxy resin (B2), and an organic solvent (C); wherein the modified polyolefin (A) is (A1) or (A2) below:

(A1): a crystalline acid-modified polyolefin having an acid value of 5 to 50 mg KOH/g-resin; or (A2): an acid-modified chlorinated polyolefin having an acid value of 5 to 50 mg KOH/g-resin and a chlorine content of 5 to 40 mass %.

8 Claims, No Drawings

POLYOLEFIN-BASED ADHESIVE COMPOSITION

TECHNICAL FIELD

The present invention relates to an adhesive composition for bonding a polyolefin resin substrate and a metal substrate. More specifically, the present invention relates to an adhesive composition comprising a modified polyolefin, an epoxy resin, and an organic solvent.

BACKGROUND ART

Conventionally used metal substrates for outer panels for consumer electronics, materials for furniture, members for building interiors, etc., are laminates obtained by applying vinyl chloride resins (hereinafter also referred to simply as "vinyl chloride") to the surface of such metal substrates, followed by lamination. However, environmental problems have recently been highlighted, and polyolefin resins have been proposed as an alternative to vinyl chloride. Polyolefin resins are widely used in various fields because they are non-toxic, highly resistant to acid, alkali, organic solvents, etc., excellent in mechanical strength and abrasion resistance, and inexpensive.

However, polyolefin resins, which were non-polar, had difficulty in bonding with metal substrates. Various adhesives have been proposed to bond such polyolefin resins and metal substrates. Typical adhesives are those obtained by mixing a solvent-dispersed modified polyolefin resin in a base adhesive in which a thermosetting resin (e.g., phenolic resin, melamine resin, or epoxy resin) or a thermoplastic resin is dissolved in an organic solvent. However, these adhesives hardly had sufficient adhesion. Furthermore, PTL 1 proposes an adhesive composition obtained by mixing an acid-modified polyolefin and an epoxy resin with catechol etc., and PTL 2 proposes an adhesive composition obtained by mixing a maleic acid-modified chlorinated polypropylene, a chelate epoxy resin, and a solvent.

CITATION LIST

Patent Literature

PTL 1: JP2003-261847A
PTL 2: JP2009-292853A

SUMMARY OF INVENTION

Technical Problem

However, according to the above methods, pot life after addition of the modified polyolefin solution was poor in some cases. Even when the pot life was not so problematic, the essential adhesion to a metal substrate and chemical resistance were not sufficient. That is, nothing satisfied all of pot life, adhesion, and chemical resistance. In particular, even when a polypropylene (hereinafter "PP") substrate was used, no adhesive allowed bonding and aging (curing) at a low temperature, such as 80° C. or less, which had little influence of thermal shrinkage etc. The term "pot life" as mentioned herein refers to the stability of a solution containing modified polyolefin mixed with a crosslinking agent or a curing agent, immediately after the mixing or within a certain period of time after the mixing.

The present invention was made in consideration of the above conventional problems. The present inventors conducted extensive research on adhesives for bonding polyolefin resin substrates and metal substrates, and consequently found that an adhesive composition comprising a modified polyolefin, an epoxy resin, and an organic solvent satisfied all of pot life, adhesion in bonding and aging at 80° C. or less, and chemical resistance. Thus, the present invention has been completed.

That is, an object of the present invention is to provide an adhesive composition that has excellent pot life after a modified polyolefin and a curing agent are mixed, excellent adhesion to both a polyolefin resin substrate and a metal substrate in bonding and aging at a low temperature, and chemical resistance.

Solution to Problem

The present inventors conducted extensive research to achieve the above object. Consequently, the following inventions have been proposed.

An adhesive composition comprising:
a modified polyolefin (A),
a glycidyl amine-type epoxy resin (B1),
a glycidyl ether-type epoxy resin (B2), and
an organic solvent (C);
wherein the modified polyolefin (A) is (A1) or (A2) below:
(A1): a crystalline acid-modified polyolefin having an acid value of 5 to 50 mg KOH/g-resin; or
(A2): an acid-modified chlorinated polyolefin having an acid value of 5 to 50 mg KOH/g-resin and a chlorine content of 5 to 40 mass %.

It is preferable that the glycidyl amine-type epoxy resin (B1) is an epoxy resin having two or more glycidyl groups per molecule.

It is preferable that the glycidyl amine-type epoxy resin (B1) is a compound represented by Formula (1):

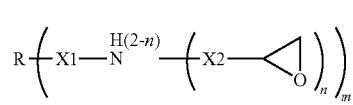

Formula (1)

wherein in Formula (1), R is substituted or unsubstituted aryl group, X1 and X2 are independently substituted or unsubstituted $C_1$-$C_5$ alkylene group, m is 1 or 2, and n is 1 or 2.

It is preferable that the glycidyl ether-type epoxy resin (B2) is an epoxy resin having two or more glycidyl groups per molecule and being free from nitrogen atom.

It is preferable that the composition comprises 0.01 to 20 parts by mass of glycidyl amine-type epoxy resin (B1), 1 to 20 parts by mass of glycidyl ether-type epoxy resin (B2), and 80 to 1000 parts by mass of organic solvent (C), based on 100 parts by mass of modified polyolefin (A).

It is preferable that the organic solvent (C) is a mixture of a solvent (C1) and a solvent (C2);
the solvent (C1) is one or more solvents selected from the group consisting of aromatic hydrocarbons, aliphatic hydrocarbons, alicyclic hydrocarbons, and halogenated hydrocarbons;
the solvent (C2) is one or more solvents selected from the group consisting of alcohol-based solvents, ketone-based solvents, ester-based solvents, and glycol ether-based solvents; and
the mass ratio of the solvent (C1) to the solvent (C2) is 50 to 97/50 to 3.

The adhesive composition according to any one of the above, which is used for bonding between a polyolefin resin substrate and a metal substrate.

A laminate of a polyolefin resin substrate and a metal substrate bonded with the adhesive composition according to any one of the above.

Advantageous Effects of Invention

The adhesive composition of the present invention comprises a modified polyolefin, two types of epoxy resins, and an organic solvent, and can maintain excellent pot life even after long-term storage, without undergoing thickening or gelation. Furthermore, the adhesive composition of the present invention can satisfy both excellent adhesion to a polyolefin resin substrate and a metal substrate even when bonding and aging are performed at a low temperature, such as 80° C., in which a polyolefin substrate is less affected by thermal shrinkage, and chemical resistance.

DESCRIPTION OF EMBODIMENTS

Embodiments of the present invention are described in detail below.

Modified Polyolefin (A)

The modified polyolefin (A) used in the present invention is a crystalline acid-modified polyolefin (A1) having an acid value of 5 to 50 mg KOH/g-resin, or an acid-modified chlorinated polyolefin (A2) having an acid value of 5 to 50 mg KOH/g-resin and a chlorine content of 5 to 40 mass %.

Crystalline Acid-Modified Polyolefin (A1)

The crystalline acid-modified polyolefin (A1) used in the present invention is not limited, but is preferably obtained by grafting at least one of polyethylene, polypropylene, and a propylene-α-olefin copolymer with at least one of α,β-unsaturated carboxylic acid and acid anhydride thereof.

The propylene-α-olefin copolymer mainly comprises propylene that is copolymerized with an α-olefin. Examples of α-olefins include ethylene, 1-butene, 1-heptene, 1-octene, 4-methyl-1-pentene, vinyl acetate, and the like, which can be used singly or in a combination of two or more. Preferred among these α-olefins are ethylene and 1-butene. Although the proportion of the propylene component and the α-olefin component in the propylene-α-olefin copolymer is not limited, the propylene component is preferably 50 mol % or higher, and more preferably 70 mol % or higher.

Examples of at least one of α,β-unsaturated carboxylic acid and acid anhydride thereof include maleic acid, itaconic acid, citraconic acid, and acid anhydride thereof. Among these, acid anhydride is preferred, and maleic acid anhydride is more preferred. Specific examples include maleic acid anhydride-modified polypropylene, maleic acid anhydride-modified propylene-ethylene copolymers, maleic acid anhydride-modified propylene-butene copolymers, maleic acid anhydride-modified propylene-ethylene-butene copolymers, and the like. These acid-modified polyolefins can be used singly or in a combination of two or more.

In terms of pot life and adhesion to the polyolefin resin substrate and metal substrate, the lower limit of the acid value of the crystalline acid-modified polyolefin (A1) must be 5 mg KOH/g-resin or more, preferably 10 mg KOH/g-resin or more, more preferably 14 mg KOH/g-resin or more, even more preferably 16 mg KOH/g-resin or more, particularly preferably 18 mg KOH/g-resin or more, and most preferably 20 mg KOH/g-resin or more. If the acid value is less than the above value, compatibility with an epoxy resin is low, and adhesive strength may not be expressed. Further, crosslinking density is low, and chemical resistance may be poor. The upper limit of the acid value must be 50 mg KOH/g-resin or less, preferably 48 mg KOH/g-resin or less, more preferably 46 mg KOH/g-resin or less, even more preferably 44 mg KOH/g-resin or less, particularly preferably 42 mg KOH/g-resin or less, and most preferably 40 mg KOH/g-resin or less. If the acid value is greater than the above value, the viscosity and stability of the solution decrease, and pot life may be reduced. Further, production efficiency is also reduced. Thus, an acid value exceeding the above value is not preferable.

The weight average molecular weight (Mw) of the crystalline acid-modified polyolefin (A1) is preferably within the range of 40,000 to 180,000, more preferably 50,000 to 160,000, even more preferably 60,000 to 150,000, particularly preferably 70,000 to 140,000, and most preferably 80,000 to 130,000. If the weight average molecular weight is less than the above value, cohesive power becomes weak, and adhesion may be inferior. In contrast, if the weight average molecular weight is higher than the above value, fluidity is low, and operability during bonding may be problematic. A weight average molecular weight within the above range is preferable because a curing reaction with an epoxy resin is utilized.

The crystallinity in the crystalline acid-modified polyolefin (A1) refers to one that shows a clear melting peak in the process of temperature increase at 20° C./min from −100° C. to 250° C. measured by a differential scanning calorimeter (DSC).

Crystalline acid-modified polyolefins are advantageous because they have higher cohesive power and superior adhesion and chemical resistance, as compared with amorphous polyolefins.

The melting point (Tm) of the crystalline acid-modified polyolefin (A1) is preferably within the range of 50° C. to 120° C., more preferably 60° C. to 100° C., and most preferably 70° C. to 90° C. If the melting point is less than the above value, cohesive power derived from the crystal becomes weak, and adhesion and chemical resistance may be inferior. In contrast, if the melting point is higher than the above value, solution stability and fluidity are low, and operability during bonding may be problematic.

The heat of fusion (ΔH) of the crystalline acid-modified polyolefin (A1) is preferably within the range of 5 J/g to 60 J/g, more preferably 10 J/g to 50 J/g, and most preferably 20 J/g to 40 J/g. If the heat of fusion is less than the above value, cohesive power derived from the crystal becomes weak, and adhesion and chemical resistance may be inferior. In contrast, if the heat of fusion is greater than the above value, solution stability and fluidity are low, and operability during bonding may be problematic.

The method for producing the crystalline acid-modified polyolefin (A1) is not particularly limited. Examples of the method include a radical grafting reaction in which radical species is formed in a polymer serving as a main chain, and unsaturated carboxylic acid and acid anhydride are graft-polymerized using the radical species as a polymerization starting point.

Although the radical generator is not particularly limited, an organic peroxide is preferably used. Examples of organic peroxides include, but are not limited to, peroxides, such as di-tert-butylperoxy phthalate, tert-butyl hydroperoxide, dicumyl peroxide, benzoyl peroxide, tert-butylperoxy benzoate, tert-butyl peroxy-2-ethylhexanoate, tert-butyl peroxy pivalate, methyl ethyl ketone peroxide, di-tert-butyl peroxide, and lauroyl peroxide; azonitriles, such as azobisisobutyronitrile and azobisisopropionitrile; and the like.

Acid-Modified Chlorinated Polyolefin (A2)

The acid-modified chlorinated polyolefin (A2) used in the present invention is not limited, but is preferably obtained by chlorinating the crystalline acid-modified polyolefin (A1).

In terms of pot life and adhesion to the polyolefin resin substrate and metal substrate, the lower limit of the acid value of the acid-modified chlorinated polyolefin (A2) must be 5 mg KOH/g-resin or more, preferably 10 mg KOH/g-resin or more, more preferably 14 mg KOH/g-resin or more, even more preferably 16 mg KOH/g-resin or more, particularly preferably 18 mg KOH/g-resin or more, and most preferably 20 mg KOH/g-resin or more. If the acid value is less than the above value, compatibility with an epoxy resin is low, and adhesive strength may not be expressed. Further, crosslinking density is low, and chemical resistance may be poor. The upper limit of the acid value must be 50 mg KOH/g-resin or less, preferably 48 mg KOH/g-resin or less, more preferably 46 mg KOH/g-resin or less, even more preferably 44 mg KOH/g-resin or less, particularly preferably 42 mg KOH/g-resin or less, and most preferably 40 mg KOH/g-resin or less. If the acid value exceeds the above value, the viscosity and stability of the solution decrease, and pot life may be reduced. Further, production efficiency is also reduced. Thus, an acid value exceeding the above values is not preferable.

In terms of solution stability and adhesion to the polyolefin resin substrate and metal substrate, the lower limit of the chlorine content of the acid-modified chlorinated polyolefin (A2) must be 5 mass % or higher, preferably 8 mass % or higher, more preferably 10 mass % or higher, particularly preferably 12 mass % or higher, and most preferably 14 mass % or higher. If the chlorine content is less than the above value, solution stability decreases, and pot life may be reduced. Further, compatibility with the glycidyl amine-type epoxy resin (B1) and/or the glycidyl ether-type epoxy resin (B2) is low, and adhesive strength may not be expressed. The upper limit of the chlorine content must be 40 mass % or less, preferably 38 mass % or less, even more preferably 35 mass % or less, particularly preferably 32 mass % or less, and most preferably 30 mass % or less. If the chlorine content exceeds the above value, the crystallinity of the acid-modified chlorinated polyolefin (A2) decreases, and adhesive strength may be reduced.

The weight average molecular weight (Mw) of the acid-modified chlorinated polyolefin (A2) is preferably within the range of 40,000 to 180,000, more preferably 50,000 to 160,000, even more preferably 60,000 to 150,000, particularly preferably 70,000 to 140,000, and most preferably 80,000 to 130,000. If the weight average molecular weight is less than the above value, cohesive power becomes weak, and adhesion may be inferior. In contrast, if the weight average molecular weight is greater than the above value, fluidity is low, and operability during bonding may be problematic. A weight average molecular weight within the above range is preferable because a curing reaction with the glycidyl amine-type epoxy resin (B1) and/or the glycidyl ether-type epoxy resin (B2) is utilized.

The method for producing the acid-modified chlorinated polyolefin (A2) is not particularly limited. For example, the acid-modified chlorinated polyolefin (A2) can be obtained by dissolving an acid-modified polyolefin in a halogenated hydrocarbon, such as chloroform, and introducing chlorine.

Glycidyl Amine-Type Epoxy Resin (B1)

The glycidyl amine-type epoxy resin (B1) used in the present invention is not particularly limited, as long as it is an epoxy resin having one or more glycidyl groups per molecule. The glycidyl amine-type epoxy resin (B1) is preferably an epoxy resin having two or more glycidyl groups per molecule, more preferably an epoxy resin having three or more glycidyl groups per molecule, and even more preferably an epoxy resin having four or more glycidyl groups per molecule.

Moreover, as the glycidyl amine-type epoxy resin (B1), a compound represented by Formula (1) below is preferably used because it further improves chemical resistance.

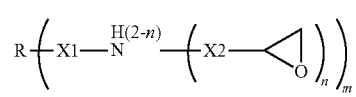

Formula (1)

In Formula (1), R is substituted or unsubstituted aryl group, preferably substituted or unsubstituted phenyl group. The substituent of the aryl group is not particularly limited. Examples include alkyl group having 1 or more and 5 or less carbon atoms, alkoxy group having 1 or more and 5 or less carbon atoms, hydroxyl group, amino group, glycidyl group, glycidyl amino group, and glycidyl ether group. X1 and X2 are independently substituted or unsubstituted linear alkylene group having 1 or more and 5 or less carbon atoms, preferably 4 or less carbon atoms, more preferably 3 or less carbon atoms, and even more preferably 2 or less carbon atoms. The substituent of the alkylene group is not particularly limited. Examples include alkyl group having 1 or more and 5 or less carbon atoms, alkoxy group having 1 or more and 5 or less carbon atoms, and amino group. m is 1 or 2, and n is 1 or 2. It is preferable that m or n is 2. It is more preferable that m and n are both 2.

Specific examples of the glycidyl amine-type epoxy resin (B1) include, but are not limited to, glycidyl amine-based resins, such as tetraglycidyl diaminodiphenylmethane, triglycidyl para-aminophenol, tetraglycidyl bis-aminomethyl cyclohexanone, and N,N,N',N'-tetraglycidyl-m-xylenediamine. Preferable among these is N,N,N',N'-tetraglycidyl-m-xylenediamine. These glycidyl amine-type epoxy resins (B1) can be used singly or in a combination of two or more.

The amount of the glycidyl amine-type epoxy resin (B1) is preferably 0.01 parts by mass or more, more preferably 0.05 parts by mass or more, even more preferably 0.1 parts by mass or more, particularly preferably 1 part by mass or more, and most preferably 2 parts by mass or more, based on 100 parts by mass of the modified polyolefin (A). Moreover, the amount of the glycidyl amine-type epoxy resin (B1) is preferably 20 parts by mass or less, more preferably 18 parts by mass or less, even more preferably 16 parts by mass or less, particularly preferably 14 parts by mass or less, and most preferably 12 parts by mass or less. If the amount of the glycidyl amine-type epoxy resin (B1) is less than the above range, catalytic action is not expressed, and adhesion in bonding and aging at 80° C. or less, and chemical resistance may be low. If the amount of the glycidyl amine-type epoxy resin (B1) is greater than the above range, a crosslinking reaction excessively proceeds, stiffness becomes high, and adhesion tends to be reduced. Moreover, the crosslinking reaction is likely to proceed during storage of the solution of the adhesive composition, and pot life tends to be reduced.

Glycidyl Ether-Type Epoxy Resin (B2)

The glycidyl ether-type epoxy resin (B2) used in the present invention is not particularly limited, as long as it is an epoxy resin having a glycidyl ether group per molecule. The glycidyl ether-type epoxy resin (B2) is preferably an epoxy resin having two or more glycidyl groups per molecule, and more preferably an epoxy resin having two or more glycidyl groups per molecule and being free from nitrogen atom.

The amount of the glycidyl ether-type epoxy resin (B2) is preferably 1 part by mass or more, more preferably 2 parts by mass or more, even more preferably 3 parts by mass or more, particularly preferably 4 parts by mass or more, and most preferably 5 parts by mass or more, based on 100 parts by mass of the modified polyolefin (A). Moreover, the amount of the glycidyl ether-type epoxy resin (B2) is preferably 20 parts by mass or less, more preferably 18 parts by mass or less, even more preferably 16 parts by mass or less, particularly preferably 14 parts by mass or less, and most preferably 12 parts by mass or less. An amount within the above range contributes to the development of excellent adhesion and chemical resistance.

Specific examples of the glycidyl ether-type epoxy resin (B2) include, but are not limited to, phenol novolak-type epoxy resin and cresol novolak-type epoxy resin. They are preferable in terms of adhesion to the metal substrate and chemical resistance. These glycidyl ether-type epoxy resins (B2) can be used singly or in a combination of two or more.

The present invention is characterized in that two types of epoxy resins, i.e., the glycidyl amine-type epoxy resin (B1) and the glycidyl ether-type epoxy resin (B2), are used in combination as essential components. The combined use of the glycidyl amine-type epoxy resin (B1) and the glycidyl ether-type epoxy resin (B2) contributes to the development of excellent adhesion and chemical resistance. That is, the glycidyl amine-type epoxy resin (B1) has a curing effect in the reaction between the modified polyolefin (A) and the glycidyl ether-type epoxy resin (B2). Further, the glycidyl amine-type epoxy resin (B1) has a curing catalytic effect in the reaction between the modified polyolefin (A) and the glycidyl amine-type epoxy resin (B1), between the glycidyl amine-type epoxy resins (B1), between the glycidyl ether-type epoxy resins (B2), and between the glycidyl amine-type epoxy resin (B1) and the glycidyl ether-type epoxy resin (B2). Thus, adhesion to the metal substrate in bonding and aging at 80° C. or less, and chemical resistance can be improved by mixing the glycidyl amine-type epoxy resin (B1).

The total amount of the glycidyl amine-type epoxy resin (B1) and the glycidyl ether-type epoxy resin (B2) is preferably 2 to 40 parts by mass, more preferably 5 to 20 parts by mass, and most preferably 10 to 16 parts by mass, based on 100 parts by mass of the modified polyolefin (A). If the total amount is loss than the above range, a sufficient curing effect is not obtained, and adhesion and chemical resistance may be low. A total amount greater than the above range is not preferable, in terms of pot life, reduction in adhesion to the olefin substrate, and cost.

The amount of the glycidyl amine-type epoxy resin (B1) mixed is preferably 1 to 50 mass %, more preferably 2 to 30 mass %, and most preferably 3 to 10 mass %, of the entire epoxy resin. If the amount of the glycidyl amine-type epoxy resin (B1) is less than the above range, catalytic action is not expressed, and adhesion in bonding and aging at a low temperature, and chemical resistance may be low. If the amount of the glycidyl amine-type epoxy resin (B1) is greater than the above range, a crosslinking reaction excessively proceeds, stiffness becomes high, and adhesion tends to be reduced. Moreover, the crosslinking reaction is likely to proceed during storage of the solution of the adhesive composition, and pot life tends to be reduced.

As the epoxy resin used in the present invention, other epoxy resins can also be used in combination. Examples thereof include glycidyl ester-type epoxy resins, such as hexahydrophthalic acid glycidyl ester and dimer acid glycidyl ester; triglycidyl isocyanurate; alicyclic or aliphatic epoxides, such as 3,4-epoxycyclohexylmethyl carboxylate, epoxidized polybutadiene, and epoxidized soybean oil; and the like. These can be used singly or in a combination of two or more.

Organic Solvent (C)

The organic solvent (C) used in the present invention is not particularly limited, as long as it can dissolve the modified polyolefin (A), glycidyl amine-type epoxy resin (B1), and glycidyl ether-type epoxy resin (B2). Specific examples include aromatic hydrocarbons, such as benzene, toluene, and xylene; aliphatic hydrocarbons, such as hexane, heptane, octane, and decane; alicyclic hydrocarbons, such as cyclohexane, cyclohexane, methylcyclohexane, and ethylcyclohexane; halogenated hydrocarbons, such as trichloroethylene, dichloroethylene, chlorobenzene, and chloroform; alcohol-based solvents, such as methanol, ethanol, isopropyl alcohol, butanol, pentanol, hexanol, propanediol, and phenol; ketone-based solvents, such as acetone, methyl isobutyl ketone, methyl ethyl ketone pentanone, hexanone, cyclohexanone, isophorone, and acetophenone; cellosolves, such as methyl cellosolve and ethyl cellosolve; ester-based solvents, such as methyl acetate, ethyl acetate, butyl acetate, methyl propionate, and butyl formate; glycol ether-based solvents, such as ethylene glycol mono-n-butyl ether, ethylene glycol mono-iso-butyl ether, ethylene glycol mono-tert-butyl ether, diethylene glycol mono-n-butyl ether, diethylene glycol mono-iso-butyl ether, triethylene glycol mono-n-butyl ether, and tetraethylene glycol mono-n-butyl ether; and the like. These solvents can be used singly or in a combination of two or more.

The amount of the organic solvent (C) is preferably 80 parts by mass or more, more preferably 90 parts by mass or more, even more preferably 100 parts by mass or more, and particularly preferably 110 parts by mass or more, based on 100 parts by mass of the modified polyolefin (A). Moreover, the amount of the organic solvent (C) is preferably 1000 parts by mass or less, more preferably 900 parts by mass or less, even more preferably 800 parts by mass or less, and particularly preferably 700 parts by mass or less. If the amount of the organic solvent (C) is less than the above range, the solution state and pot life may be reduced. If the amount of the organic solvent (C) is greater than the above range, there may be disadvantages in terms of production cost and transportation cost.

In terms of the solution states of the adhesive composition and pot life, the organic solvent (C) is preferably a mixture of at least one solvent (C1) selected from the group consisting of aromatic hydrocarbons, aliphatic hydrocarbons, alicyclic hydrocarbons, and halogenated hydrocarbons; and at least one solvent (C2) selected from the group consisting of alcohol-based solvents, ketone-based solvents, ester-based solvents, and glycol ether-based solvents. The mixing ratio is preferably solvent (C1)/solvent (C2)=50 to 97/50 to 3 (mass ratio), more preferably 55 to 95/45 to 5 (mass ratio), even more preferably 60 to 90/40 to 10 (mass ratio), and particularly preferably 70 to 80/30 to 20 (mass ratio). If the mixing ratio is outside of the above range, the solution state of the adhesive composition and pot life may be reduced. It is particularly preferable that the solvent (C1) is an aromatic hydrocarbon or an alicyclic hydrocarbon, while the solvent (C2) is a ketone-based solvent.

Adhesive Composition

The adhesive composition of the present invention is a mixture of the modified polyolefin (A), glycidyl amine-type epoxy resin (B1), glycidyl ether-type epoxy resin (B2), and organic solvent (C). As the modified polyolefin (A), the crystalline acid-modified polyolefin (A1) may be singly used, the acid-modified chlorinated polyolefin (A2) may be singly used, or both polyolefins may be used in combination. The modified polyolefin (A), glycidyl amine-type epoxy resin (B1), and glycidyl ether-type epoxy resin (B2) may be dissolved or dispersed in the organic solvent (C). In terms of pot life, they are preferably dissolved in the organic solvent (C).

The adhesive composition of the present invention may contain various additives, in addition to the modified polyolefin (A), glycidyl amine-type epoxy resin (B1), glycidyl ether-type epoxy resin (B2), and organic solvent (C), within a range that does not impair the performance of the present invention. Although the additives are not particularly limited, a flame retardant, pigment, anti-blocking agent, etc., are preferably used.

Laminate

The laminate of the present invention is obtained by laminating a polyolefin resin substrate and a metal substrate with the adhesive composition of the present invention.

As the lamination method, conventionally known laminate production technology can be used. Although the method is not limited, the adhesive composition is, for example, applied to the surface of a metal substrate using a suitable coating means, such as roll coater or bar coater, followed by drying; after drying, a polyolefin resin substrate is laminated and bonded to the coating surface while the adhesive layer formed on the surface of the metal substrate is in a molten state, thereby obtaining a laminate structure.

The thickness of the adhesive layer formed from the adhesive composition is not particularly limited; however, it is preferably 0.5 to 10 µm, more preferably 0.8 to 9.5 µm, and even more preferably 1 to 9 µm.

Polyolefin Resin Substrate

The polyolefin resin substrate can be suitably selected from conventionally known polyolefin resins. Examples include, but are not limited to, polyethylene, polypropylene, ethylene-propylene copolymers, and the like. It is particularly preferable to use a non-oriented polypropylene film (hereinafter, "CPP"). The thickness is not particularly limited; however, it is preferably 20 to 100 µm, more preferably 25 to 95 µm, and even more preferably 30 to 90 µm. The polyolefin resin substrate may contain pigments and various additives, as necessary.

Metal Substrate

The metal substrate is not particularly limited. Examples include various metals, such as aluminum, copper, steel, zinc, duralumin, and die-casting; and alloys thereof. Moreover, the metal substrate can have any shape, such as metal foil, rolled steel plate, panel, pipe, can, or cap. In general, the form of aluminum foil is preferred, in terms of processability etc. The metal substrate is generally used in the form of a sheet having a thickness of 0.01 to 10 mm, and preferably 0.02 to 5 mm, although it varies depending on the purpose of use.

Moreover, the surface of such a metal substrate may be subjected to surface treatment beforehand, or may be untreated. The same effect can be exhibited in both cases.

The present invention is described in more detail below with reference to Examples. However, the present invention is not limited to the Examples. The term "part" in the Examples and Comparative Examples indicates "part by mass."

Production Example of Crystalline Acid-Modified Polyolefin (A1)

Production Example 1

100 parts by mass of propylene-butene copolymer ("Tafmer (registered trademark) XM7080" produced by Mitsui Chemicals, Inc.), 150 parts by mass of toluene, 25 parts by mass of maleic acid anhydride, and 6 parts by mass of di-tert-butyl peroxide were placed in a 1-L autoclave. The mixture was heated to 140° C., and then stirred for 3 hours. After cooling the resulting reaction mixture, the reaction mixture was poured into a container containing a large amount of methyl ethyl ketone, and the resin was precipitated. Then, the solution containing the resin was centrifuged to thereby separate and purify an acid-modified propylene-butene copolymer in which maleic acid anhydride was graft-polymerized, (poly)maleic acid anhydride, and low-molecular-weight substances. After drying under reduced pressure at 70° C. for 5 hours, a maleic acid anhydride-modified propylene-butene copolymer (PO-1, acid value: 48 mg KOH/µ-resin, weight average molecular weight: 50,000, Tm: 75° C., ΔH: 25 J/g) was obtained.

Production Example 2

A maleic acid anhydride-modified propylene-butene copolymer (PO-2, acid value: 25 mg KOH/g-resin, weight average molecular weight: 80,000, Tm: 75° C., ΔH: 30 J/g) was obtained in the same manner as in Production Example 1, except that the amount of maleic acid anhydride was changed to 20 parts by mass.

Production Example 3

A maleic acid anhydride-modified propylene-butene copolymer (PO-3, acid value: 5 mg KOH/g-resin, weight average molecular weight: 180,000, Tm: 80° C., ΔH: 25 J/g) was obtained in the same manner as in Production Example 1, except that the amount of maleic acid anhydride was changed to 3 parts by mass, and the amount of di-tert-butyl peroxide was changed to 0.5 parts by mass.

Production Example 4

A maleic acid anhydride-modified propylene-butene copolymer (PO-4, acid value: 55 mg KOH/g-resin, weight average molecular weight: 40,000, Tm: 70° C., ΔH: 25 J/g) was obtained in the same manner as in Production Example 1, except that the amount of maleic acid anhydride was changed to 30 parts by mass.

Production Example 5

A maleic acid anhydride-modified propylene-butene copolymer (PO-5, acid value: 3 mg KOH/g-resin, weight average molecular weight: 200,000, Tm: 80° C., ΔH: 25 J/g) was obtained in the same manner as in Production Example 1, except that the amount of maleic acid anhydride was changed to 2 parts by mass, and the amount of di-tert-butyl peroxide was changed to 0.5 parts by mass.

Production Example of Acid-Modified Chlorinated Polyolefin (A2)

Production Example 6

100 parts by mass of a propylene-ethylene copolymer synthesized by a general method (MFR in a 230° C. atmosphere=5 g/10 minutes), 150 parts by mass of toluene, 25 parts by mass of maleic acid anhydride, and 6 parts by mass of di-tert-butyl peroxide were placed in a 1-L autoclave equipped with a stirrer. The mixture was heated to 140° C., and then stirred for 3 hours. After cooling the resulting reaction mixture, the reaction mixture was poured into a container containing a large amount of methyl ethyl ketone, and the resin was precipitated. Then, the solution containing the resin was centrifuged to thereby separate and purify an acid-modified propylene-ethylene copolymer in which maleic acid anhydride was graft-polymerized, (poly)maleic acid anhydride, and low-molecular-weight substances. After drying under reduced pressure at 70° C. for 5 hours, a maleic acid anhydride-modified propylene-ethylene copolymer (PO-1) was obtained. Subsequently, 100 parts by mass of PO-1 and 1700 parts by mass of chloroform were placed in a 2-L glass-lined reactor, and the reactor was sealed. The solution in the reactor was heated while stirring and dispersing, and dissolved at an internal temperature of the reactor of 120° C. for 1 hour. After cooling the internal temperature of the reactor to 110° C., 0.5 g of t-butyl peroxy-2-ethylhexanoate was added, and 70 parts by mass of chlorine was introduced. After the internal temperature of the reactor was cooled to 60° C., and 1400 parts by mass of chloroform was removed, 4 parts by mass of p-t-butylphenyl glycidyl ether was added as a stabilizing agent. Then, drying was performed to obtain a maleic acid anhydride-modified chlorinated propylene-ethylene copolymer (CPO-1, acid value: 48 mg KOH/g-resin, chlorine content: 20 mass %, weight average molecular weight: 50,000).

Production Example 7

A maleic acid anhydride-modified chlorinated propylene-ethylene copolymer (CPO-2, acid value: 25 mg KOH/g-resin, chlorine content: 20 mass %, weight average molecular weight: 80,000) was obtained in the same manner as in Production Example 6, except that the amount of maleic acid anhydride was changed to 20 parts by mass.

Production Example 8

A maleic acid anhydride-modified chlorinated propylene-ethylene copolymer (CPO-3, acid value: 5 mg KOH/g-resin, chlorine content: 20 mass %, weight average molecular weight: 180,000) was obtained in the same manner as in Production Example 6, except that the amount of maleic acid anhydride was changed to 3 parts by mass, and the amount of di-tert-butyl peroxide was changed to 0.5 parts by mass.

Production Example 9

A maleic acid anhydride-modified chlorinated propylene-ethylene copolymer (CPO-4, acid value: 55 mg KOH/g-resin, chlorine content: 20 mass %, weight average molecular weight: 40,000) was obtained in the same manner as in Production Example 6, except that the amount of maleic acid anhydride was changed to 30 parts by mass.

Production Example 10

A maleic acid anhydride-modified chlorinated propylene-ethylene copolymer (CPO-5, acid value: 3 mg KOH/g-resin, chlorine content: 20 mass %, weight average molecular weight: 200,000) was obtained in the same manner as in Production Example 6, except that the amount of maleic acid anhydride was changed to 2 parts by mass, and the amount of di-tert-butyl peroxide was changed to 0.5 parts by mass.

Production Example 11

A maleic acid anhydride-modified chlorinated propylene-ethylene copolymer (CPO-6, acid value: 19 mg KOH/g-resin, chlorine content: 38 mass %, weight average molecular weight: 90,000) was obtained in the same manner as in Production Example 6, except that the amount of maleic acid anhydride was changed to 20 parts by mass, and the amount of chlorine introduced was changed to 130 parts by mass.

Production Example 12

A maleic acid anhydride-modified chlorinated propylene-ethylene copolymer (CPO-7, acid value: 29 mg KOH/g-resin, chlorine content: 6 mass %, weight average molecular weight: 80,000) was obtained in the same manner as in Production Example 6, except that the amount of maleic acid anhydride was changed to 20 parts by mass, and the amount of chlorine introduced was changed to 20 parts by mass.

Production Example 13

A maleic acid anhydride-modified chlorinated propylene-ethylene copolymer (CPO-8, acid value: 17 mg KOH/g-resin, chlorine content: 44 mass %, weight average molecular weight: 100,000) was obtained in the same manner as in Production Example 6, except that the amount of maleic acid anhydride was changed to 20 parts by mass, and the amount of chlorine introduced was changed to 150 parts by mass.

Production Example 14

A maleic acid anhydride-modified chlorinated propylene-ethylene copolymer (CPO-9, acid value: 30 mg KOH/g-resin, chlorine content: 2 mass %, weight average molecular weight: 80,000) was obtained in the same manner as in Production Example 6, except that the amount of maleic acid anhydride was changed to 20 parts by mass, and the amount of chlorine introduced was changed to 7 parts by mass.

Production of Main Agent 1

100 parts by mass of the maleic acid anhydride-modified propylene-butene copolymer (PO-1) obtained in Production Example 1, 280 parts by mass of methylcyclohexane, and 120 parts by mass of methyl ethyl ketone were placed in a 500-ml four-necked flask equipped with a water-cooled reflux condenser and a stirrer. The mixture was heated to 80° C. while stirring, and stirring was continued for 1 hour to thereby obtain a main agent 1. Table 1 shows the solution state.

Production of Main Agents 2 to 29

Main agents 2 to 29 were produced in the same manner as the main agent 1, while changing the crystalline acid-modified polyolefin or acid-modified chlorinated polyolefin, and the organic solvent as shown in Tables 1 and 2. Tables 1 and 2 show the amount of each component and the solution state. However, the main agents 13 and 29, which had a poor solution state and were gelled, could not be evaluated as adhesives.

TABLE 1

| | | Main agent 1 | Main agent 2 | Main agent 3 | Main agent 4 | Main agent 5 | Main agent 6 | Main agent 7 | Main agent 8 | Main agent 9 | Main agent 10 | Main agent 11 | Main agent 12 | Main agent 13 |
|---|---|---|---|---|---|---|---|---|---|---|---|---|---|---|
| Acid-modified polyolefin (part by mass) | PO-1 (acid value: 48 mg KOH/g-resin, Mw: 50,000) (Tm = 75° C., ΔH = 25 J/g) | 100 | | | | | | | | | | | | |
| | PO-2 (acid value: 25 mg KOH/g-resin, Mw: 80,000) (Tm = 75° C., ΔH = 30 J/g) | | 100 | | 100 | 100 | 100 | 100 | 100 | 100 | 100 | | | 100 |
| | PO-3 (acid value: 5 mg KOH/g-resin, Mw: 180,000) (Tm = 80° C., ΔH = 25 J/g) | | | 100 | | | | | | | | | | |
| | PO-4 (acid value: 55 mg KOH/g-resin, Mw: 40,000) (Tm = 70° C., ΔH = 25 J/g) | | | | | | | | | | | 100 | | |
| | PO-5 (acid value: 3 mg KOH/g-resin, Mw: 200,000) (Tm = 80° C., ΔH = 25 J/g) | | | | | | | | | | | | 100 | |
| Methylcyclohexane (part by mass) | | 280 | 280 | 280 | 630 | 70 | | 280 | | 200 | 388 | 280 | 280 | 47 |
| Toluene (part by mass) | | | | | | | 280 | | 280 | | | | | |
| Methyl ethyl ketone (part by mass) | | 120 | 120 | 120 | 270 | 30 | 120 | | | 200 | 12 | 120 | 120 | 20 |
| Methyl isobutyl ketone (part by mass) | | | | | | | | 120 | 120 | | | | | |
| Solution state | 25° C. solution viscosity (mPa·s) | 30 | 40 | 250 | 15 | 800 | 100 | 40 | 120 | 50 | 700 | 30 | 300 | * |
| | Evaluation | ○ | ○ | ○ | ○ | Δ | ○ | ○ | ○ | ○ | Δ | ○ | ○ | X |

*25° C. solution viscosity could not be measured because of gelation.

TABLE 2

| | | Main agent 14 | Main agent 15 | Main agent 16 | Main agent 17 | Main agent 18 | Main agent 19 | Main agent 20 | Main agent 21 | Main agent 22 | Main agent 23 | Main agent 24 | Main agent 25 | Main agent 26 | Main agent 27 | Main agent 28 | Main agent 29 |
|---|---|---|---|---|---|---|---|---|---|---|---|---|---|---|---|---|---|
| Acid-modified chlorinated polyolefin (part by mass) | CPO-1 (acid value: 48 mg KOH/g-resin, chlorine content = 20 mass %, Mw: 50,000) | 100 | | | | | | | | | | | | | | | |
| | CPO-2 (acid value: 25 mg KOH/g-resin, chlorine content = 20 mass %, Mw: 80,000) | | 100 | | 100 | 100 | 100 | 100 | 100 | 100 | 100 | 100 | | | | | |
| | CPO-3 (acid value: 5 mg KOH/g-resin, chlorine content = 20 mass %, Mw: 180,000) | | | 100 | | | | | | | | | | | | | |
| | CPO-4 (acid value: 55 mg KOH/g-resin, chlorine content = 20 mass %, Mw: 40,000) | | | | | | | | | | | | | 100 | | | |
| | CPO-5 (acid value: 3 mg KOH/g-resin, chlorine content = 20 mass %, Mw: 200,000) | | | | | | | | | | | | | | 100 | | |
| | CPO-6 (acid value: 19 mg KOH/g-resin, chlorine content = 38 mass %, Mw: 90,000) | | | | | | | | | | | | 100 | | | | |
| | CPO-7 (acid value: 29 mg KOH/g-resin, chlorine content = 6 mass %, Mw: 80,000) | | | | | | | | | | | | | | 100 | | |
| | CPO-8 (acid value: 17 mg KOH/g-resin, chlorine content = 44 mass %, Mw: 100,000) | | | | | | | | | | | | | | | | 100 |

TABLE 2-continued

| | Main agent 14 | Main agent 15 | Main agent 16 | Main agent 17 | Main agent 18 | Main agent 19 | Main agent 20 | Main agent 21 | Main agent 22 | Main agent 23 | Main agent 24 | Main agent 25 | Main agent 26 | Main agent 27 | Main agent 28 | Main agent 29 |
|---|---|---|---|---|---|---|---|---|---|---|---|---|---|---|---|---|
| CPO-9 (acid value: 30 mg KOH/g-resin, chlorine content = 2 mass %, Mw: 80,000) | | | | | | | | | | | | | | | | 100 |
| Methylcyclohexane (part by mass) | 280 | 280 | 280 | 630 | 70 | | 280 | | 200 | 388 | 280 | 280 | 280 | 280 | 280 | 280 |
| Toluene (part by mass) | | | | | | 280 | | 280 | | | | | | | | |
| Methyl ethyl ketone (part by mass) | 120 | 120 | 120 | 270 | 30 | 120 | | | 200 | 12 | 120 | 120 | 120 | 120 | 120 | 120 |
| Methyl isobutyl ketone (part by mass) | | | | | | | 120 | 120 | | | | | | | | |
| Solution state | 25° C. solution viscosity (mPa·s) | 30 | 40 | 250 | 15 | 800 | 100 | 40 | 120 | 50 | 700 | 30 | 400 | 30 | 300 | 40 | * |
| | Evaluation | ○ | ○ | ○ | ○ | Δ | ○ | ○ | ○ | ○ | Δ | ○ | ○ | ○ | ○ | ○ | X |

*25° C. solution viscosity could not be measured because of gelation

Example 1

An adhesive composition was obtained by mixing 500 parts by mass of the main agent 1, and, as curing agents, 19.8 parts by mass of phenol novolak-type epoxy resin (glycidyl ether-type epoxy resin (B2)) and 0.2 parts by mass of TETRAD (registered trademark)-X (glycidyl amine-type epoxy resin (B1)). Table 3 shows the evaluation results of pot life, adhesion, and chemical resistance.

Examples 2 to 32 and Comparative Examples 1 to 15

Examples 2 to 32 and Comparative Examples 1 to 15 were performed in the same manner as in Example 1, while changing the main agents 1 to 29 and each curing agent as shown in Tables 3 to 6. Tables 3 to 6 show the amount of each component, pot life, adhesion, and chemical resistance.

TABLE 3

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|---|---|---|---|---|---|---|
| Main agent 1 (part by mass) | | | 500 | 500 | 500 | | | | | | | | | | | | |
| Main agent 2 (part by mass) | | | | | | 500 | 500 | | | | | | | | | | |
| Main agent 3 (part by mass) | | | | | | | | 500 | 500 | 500 | | | | | | | |
| Main agent 4 (part by mass) | | | | | | | | | | | 1000 | | | | | | |
| Main agent 5 (part by mass) | | | | | | | | | | | | 200 | | | | | |
| Main agent 6 (part by mass) | | | | | | | | | | | | | 500 | | | | |
| Main agent 7 (part by mass) | | | | | | | | | | | | | | 500 | | | |
| Main agent 8 (part by mass) | | | | | | | | | | | | | | | 500 | | |
| Main agent 9 (part by mass) | | | | | | | | | | | | | | | | 500 | |
| Main agent 10 (part by mass) | | | | | | | | | | | | | | | | | 500 |
| Curing agent (part by mass) | Glycidyl ether-type epoxy resin (B2) | Phenol novolak-type epoxy resin (jER 152) | 19.8 | 18 | 10 | 10.8 | | 2.97 | 2.7 | 1.5 | 10.8 | 10.8 | 10.8 | 10.8 | 10.8 | 10.8 | 10.8 |
| | | o-cresol novolak-type epoxy resin (YDCN-700-3) | | | | | 10.8 | | | | | | | | | | |
| | Glycidyl amine-type epoxy resin (B1) | N,N,N',N'-tetraglycidyl-m-xylenediamine (TETRAD-X) | 0.2 | 2 | 10 | 1.2 | 1.2 | 0.03 | 0.3 | 1.5 | 1.2 | 1.2 | 1.2 | 1.2 | 1.2 | 1.2 | 1.2 |
| Pot life (25° C.) | 25° C. solution viscosity (mPa·s) | | 90 | 130 | 150 | 140 | 130 | 340 | 360 | 370 | 40 | 830 | 170 | 120 | 150 | 130 | 760 |
| | Evaluation | | ○ | ○ | ○ | ○ | ○ | ○ | ○ | ○ | ○ | Δ | ○ | ○ | ○ | ○ | Δ |
| Pot life (40° C.) | 25° C. solution viscosity (mPa·s) | | 200 | 250 | 290 | 240 | 230 | 390 | 400 | 410 | 70 | 900 | 250 | 230 | 230 | 240 | 850 |
| | Evaluation | | ○ | ○ | ○ | ○ | ○ | ○ | ○ | ○ | ○ | Δ | ○ | ○ | ○ | ○ | Δ |
| Adhesion | Adhesive strength (N/cm) | | 7.9 | 7.5 | 7.1 | Broken | 8.5 | 7.0 | 7.2 | 7.2 | Broken | Broken | Broken | Broken | Broken | Broken | 7.2 |
| | Evaluation | | ◎ | ◎ | ○ | ☆ | ☆ | ○ | ○ | ○ | ☆ | ☆ | ☆ | ☆ | ☆ | ☆ | ○ |
| Chemical resistance (electrolyte resistance) | Adhesive strength (N/cm) | | 8.0 | 7.3 | 7.0 | Broken | 8.8 | 7.8 | 7.9 | 7.0 | Broken | Broken | Broken | Broken | Broken | Broken | 7.3 |
| | Evaluation | | ☆ | ○ | ○ | ☆ | ☆ | ◎ | ◎ | ○ | ☆ | ☆ | ☆ | ☆ | ☆ | ☆ | ○ |

TABLE 4

| | Ex. 16 | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 | Ex. 29 | Ex. 30 | Ex. 31 | Ex. 32 |
|---|---|---|---|---|---|---|---|---|---|---|---|---|---|---|---|---|---|
| Main agent 14 (part by mass) | 500 | | | | | | | | | | | | | | | | |
| Main agent 15 (part by mass) | | 500 | | | | | | | | | | | | | | | |
| Main agent 16 (part by mass) | | | 500 | | | | | | | | | | | | | | |
| Main agent 17 (part by mass) | | | | 500 | | | | | | | | | | | | | |
| Main agent 18 (part by mass) | | | | | 500 | | | | | | | | | | | | |
| Main agent 19 (part by mass) | | | | | | 500 | | | | | | | | | | | |
| Main agent 20 (part by mass) | | | | | | | 500 | | | | | | | | | | |
| Main agent 21 (part by mass) | | | | | | | | 500 | | | | | | | | | |
| Main agent 22 (part by mass) | | | | | | | | | 1000 | 200 | | | | | | | |
| Main agent 23 (part by mass) | | | | | | | | | | | 500 | | | | | | |
| Main agent 24 (part by mass) | | | | | | | | | | | | 500 | 500 | 500 | 500 | 500 | |
| Main agent 25 (part by macs) | | | | | | | | | | | | | | | | | 500 |
| Curing agent (part by mass) Glycidyl ether-type epoxy resin (B2) Phenol novolak-type epoxy resin (jER 152) | 19.8 | 18 | 10 | 10.8 | | 2.97 | 2.7 | 1.5 | | | | | | | | | |
| o-cresol novolak-type epoxy resin (YDCN-700-3) | | | | | 10.8 | | | | | | | | | | | | |
| Glycidyl amine-type epoxy resin (B1) N,N,N',N'-tetraglycidyl-m-xylenediamine (TETRAD-X) | 0.2 | 2 | 10 | 1.2 | 1.2 | 0.03 | 0.3 | 1.5 | 10.8 | 10.8 | 10.8 | 10.8 | 10.8 | 10.8 | 10.8 | 10.8 | 10.8 |
| | | | | | | | | | 1.2 | 1.2 | 1.2 | 1.2 | 1.2 | 1.2 | 1.2 | 1.2 | 1.2 |
| Pot life (25° C.) 25° C. solution viscosity (mPa·s) | 90 | 130 | 150 | 140 | 130 | 340 | 360 | 370 | 40 | 830 | 170 | 120 | 150 | 130 | 760 | 120 | 190 |
| Evaluation | ○ | ○ | ○ | ○ | ○ | ○ | ○ | ○ | ○ | △ | ○ | ○ | ○ | ○ | △ | ○ | ○ |
| Pot life (40° C.) 25° C. solution viscosity (mPa·s) | 200 | 250 | 290 | 240 | 230 | 390 | 400 | 410 | 70 | 900 | 250 | 230 | 230 | 240 | 850 | 200 | 330 |
| Evaluation | ○ | ○ | ○ | ○ | ○ | ○ | ○ | ○ | ○ | △ | ○ | ○ | ○ | ○ | △ | ○ | ○ |
| Adhesion Adhesive strength (N/cm) | 7.9 | 7.5 | 7.1 | Broken | 8.5 | 7.0 | 7.2 | 7.2 | Broken | Broken | Broken | Broken | Broken | Broken | 7.2 | 7.1 | 7.0 |
| Evaluation | ◎ | ◎ | ○ | ☆ | ○ | ○ | ◎ | ○ | ☆ | ☆ | ☆ | ☆ | ☆ | ☆ | ○ | ○ | ○ |
| Chemical resistance (electrolyte resistance) Adhesive strength (N/cm) | 8.0 | 7.3 | 7.0 | Broken | 8.8 | 7.8 | 7.9 | 7.0 | Broken | Broken | Broken | Broken | Broken | Broken | 7.3 | 7.0 | 7.1 |
| Evaluation | ☆ | ○ | ○ | ☆ | ☆ | ○ | ○ | ○ | ☆ | ☆ | ☆ | ☆ | ☆ | ☆ | ○ | ○ | ○ |

TABLE 5

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Main agent 2 (part by mass) | | 500 | | | | 500 | 500 | 500 |
| Main agent 11 (part by mass) | | | 500 | | | | | |
| Main agent 12 (part by mass) | | | | 500 | | | | |
| Main agent 13 (part by mass) | | | | | 500 | | | |
| Curing agent (part by mass) | Glycidyl ether-type epoxy resin (B2) | Phenol novolak-type epoxy resin (jER 152) | 10.8 | 10.8 | 10.8 | 10.8 | | | |
| | Glycidyl amine-type epoxy resin (B1) | N,N,N',N'-tetraglycidyl-m-xylenediamine (TETRAD-X) | | 1.2 | 1.2 | 1.2 | | | 1.2 |
| | Polyisocyanate | Duranate TPA-100 | | | | | | 3 | |
| | Silane coupling agent | KBM-403 | | | | | | | 3 |
| Pot life (25° C.) | 25° C. solution viscosity (mPa · s) | | 35 | 550 | 400 | — | * | 35 | 35 |
| | Evaluation | | ○ | Δ | ○ | — | X | ○ | ○ |
| Pot life (40° C.) | 25° C. solution viscosity (mPa · s) | | 38 | * | 460 | — | * | 36 | 38 |
| | Evaluation | | ○ | X | ○ | — | X | ○ | ○ |
| Adhesion | Adhesive strength (N/cm) | | 3.5 | 4.0 | 2.8 | — | — | 1.0 | 3.5 |
| | Evaluation | | X | X | X | — | — | X | X |
| Chemical resistance (electrolyte resistance) | Adhesive strength (N/cm) | | 2.2 | 3.5 | 2.5 | — | — | ** | 2.2 |
| | Evaluation | | X | X | X | — | — | X | X |

*25° C. solution viscosity could not be measured because of gelation.
**CPP and aluminum foil were removed during immersion, and a T-type peel test could not be conducted.

TABLE 6

|  |  | Comp. Ex 8 | Comp. Ex. 9 | Comp. Ex. 10 | Comp. Ex. 11 | Comp. Ex. 12 | Comp. Ex. 13 | Comp. Ex. 14 | Comp. Ex. 15 |
|---|---|---|---|---|---|---|---|---|---|
| Main agent 15 (part by mass) | | 500 | | | 500 | 500 | | | 500 |
| Main agent 26 (part by mass) | | | 500 | | | | | | |
| Main agent 27 (part by mass) | | | | 500 | | | | | |
| Main agent 28 (part by mass) | | | | | | | 500 | | |
| Main agent 29 (part by mass) | | | | | | | | 500 | |
| Curing agent (part by mass) | Glycidyl ether-type epoxy resin (B2) | Phenol novolak-type epoxy resin (jER 152) | 10.8 | 10.8 | 10.8 | | | 10.8 | 10.8 | |
| | Glycidyl amine-type epoxy resin (B1) | N,N,N',N'-tetraglycidyl-m-xylenediamine (TETRAD-X) | | 1.2 | 1.2 | | | 1.2 | 1.2 | 1.2 |
| | Polyisocyanate | Duranate TPA-100 | | | | | 3 | | | |
| | Silane coupling agent | KBM-403 | | | | | | 3 | | |
| Pot life (25° C.) | 25° C. solution viscosity (mPa · s) | | 35 | 550 | 400 | * | 35 | 33 | — | 35 |
| | Evaluation | | ○ | Δ | ○ | X | ○ | ○ | — | ○ |
| Pot life (40° C.) | 25° C. solution viscosity (mPa · s) | | 38 | * | 460 | * | 36 | 35 | — | 38 |
| | Evaluation | | ○ | X | ○ | X | ○ | ○ | — | ○ |
| Adhesion | Adhesive strength (N/cm) | | 3.5 | 4.0 | 2.8 | — | 1.0 | 1.0 | — | 3.5 |
| | Evaluation | | X | X | X | — | X | X | — | X |
| Chemical resistance (electrolyte resistance) | Adhesive strength (N/cm) | | 2.2 | 3.5 | 2.5 | — | ** | ** | — | 2.2 |
| | Evaluation | | X | X | X | — | X | X | — | X |

*25° C. solution viscosity could not be measured because of gelation.
**CPP and aluminum foil were removed during immersion, and a T-type peel test could not be conducted.

The curing agents used in Tables 3 to 6 are as follows.
Glycidyl Amine-Type Epoxy Resin (B1)
N,N,N',N'-tetraglycidyl-m-xylenediamine: TETRAD (registered trademark)-X (produced by Mitsubishi Gas Chemical Co., Inc.)

Glycidyl Ether-Type Epoxy Resin (B2)
Phenol novolak-type epoxy resin: jER (registered trademark) 152 (produced by Mitsubishi Chemical Corporation)
o-cresol novolak-type epoxy resin: YDCN-700-3 (produced by Nippon Steel & Sumikin Chemical Co., Ltd.)

Other Curing Agents

Polyisocyanate: Duranate (registered trademark) TPA-100 (produced by Asahi Chemical Co., Ltd.)

Silane coupling agent: KBM-403 (produced by Shin-Etsu Chemical Co., Ltd.)

Analytical measurement and evaluation of the thus-obtained modified polyolefins, main agents, and adhesive compositions were performed in the following manner.

Measurement of Acid Value

The acid value (mg KOH/g-resin) in the present invention is a value calculated by FT-IR (produced by Shimadzu Corporation, FT-IR8200PC) from the following formula using coefficient (f) obtained from a calibration curve prepared with a chloroform solution of maleic acid anhydride (produced by Tokyo Chemical Industry Co., Ltd.), and absorbance (I) of the elastic peak (1780 cm-1) of a carbonyl (C=O) bond of maleic acid anhydride in a crystalline maleic acid anhydride-modified polyolefin solution.

Acid value (mg KOH/g-resin)=[absorbance $(I)\times(f)\times$ 2×molecular weight of potassium hydroxide× 1000 (mg)/molecular weight of maleic acid anhydride]

Molecular weight of maleic acid anhydride: 98.06

Molecular weight of potassium hydroxide: 56.11

Chlorine Content

The chlorine content in the present invention is a value measured according to JIS K-7210.

Measurement of Weight Average Molecular Weight (Mw)

The weight average molecular weight in the present invention is a value measured by an Alliance e2695 gel permeation chromatograph (hereinafter "GPC," produced by Nihon Waters K.K.; standard substance: polystyrene resin, mobile phase: tetrahydrofuran, column: Shodex KF-806+KF-803, column temperature: 40° C., flow rate: 1.0 ml/min, detector: photodiode array detector (wavelength 254 nm=ultraviolet light)).

Measurement of Melting Point and Amount of Heat of Fusion

The melting point and the amount heat of fusion in the present invention are values measured by a differential scanning calorimeter (hereinafter "DSC," Q-2000, produced by TA Instruments Japan Inc.) from the top temperature and area of the melting peak when melting by heating at a rate of 20° C./min and resinification by cooling are performed, and melting by heating is again performed.

Evaluation of Main Agent Solution State

The solution state of the main agents 1 to 29 was evaluated by measuring solution viscosity at 25° C. using a Brookfield viscometer TVB-10M (produced by Toki Sangyo Co., Ltd.; hereinafter also referred to as "B-type viscometer").

Evaluation Criteria

○ (practically excellent): less than 500 mPa·s

Δ (practically available): 500 mPa·s or more and less than 1000 mPa·s x (practically unavailable): 1000 mPa·s or more, or viscosity unmeasurable due to gelation Evaluation of Pot Life The term "pot life" refers to the stability of a solution of a crystalline acid-modified polyolefin mixed with a cross-linking agent or a curing agent, immediately after the mixing or within a certain period of time after the mixing. Excellent pot life indicates that the increase in the viscosity of the solution is low, and long-term storage is possible. Poor pot life indicates that the viscosity of the solution increases (thickening); in the worst case, gelation phenomenon occurs, making the application of the solution to a substrate difficult, and long-term storage is not possible.

The pot life of the adhesive compositions obtained in Examples 1 to 32 and Comparative Examples 1 to 15 was evaluated by measuring solution viscosity at 25° C. using the B-type viscometer after storage at 25° C. and 40° C. for 24 hours. Tables 3 to 6 show the evaluation results.

Evaluation Criteria

○ (practically excellent): less than 500 mPa·s

Δ (practically available): 500 mPa·s or more and less than 1000 mPa·s x (practically unavailable): 1000 mPa·s or more, or viscosity unmeasurable due to gelation Production of Laminate of Metal Substrate and Polyolefin Resin Substrate The metal substrate used was aluminum foil (8079-0, produced by Sumikei Aluminum Foil Co., Ltd.; thickness: 40 μm), and the polyolefin resin substrate used was a non-oriented polypropylene film (Pylen (registered trademark) film CT, produced by Toyobo Co., Ltd.; thickness: 40 μm) (hereinafter also referred to as "CPP").

The adhesive compositions obtained in Examples 1 to 32 and Comparative Examples 1 to 15 were each applied to a metal substrate using a bar coater so that the film thickness of the adhesive layer after drying was 3 μm. The coated surface was dried using a hot-air dryer in an atmosphere at 100° C. for 1 minute, thereby obtaining an adhesive layer having a film thickness of 3 μm. A polyolefin resin substrate was laminated on the adhesive layer surface, bonded using a small tabletop test laminator (SA-1010-S, produced by Tester Sangyo Co., Ltd.) at 80° C. at 0.3 MPa at 1 m/min, and aged at 40° C. at 50% RH for 120 hours, thereby obtaining a laminate.

The thus-obtained laminates were evaluated in the following manner.

Evaluation of Adhesion

The laminates were each cut to a size of 100 mm×15 mm, and the adhesion was evaluated by a T-type peel test. Tables 3 to 6 show the evaluation results.

T-Type Peel Test

Peel strength was measured according to the test method of ASTM-D 1876-61 using a Tensilon RTM-100 (produced by Orientec Corporation) in an environment at 25° C. at a tensile speed of 50 mm/min. The peel strength (N/cm) between the metal substrate and the polyolefin resin substrate was obtained as the average of 5 test values.

Evaluation Criteria

☆ (particularly practically excellent): 8.0 N/cm or more, or CPP broken (hereinafter also referred to simply as "broken"); The term "broken" means that peeling does not occur in the interface of the metal substrate and CPP, and the metal substrate or CPP is broken.

◉ (practically excellent): 7.5 N/cm or more and less than 8.0 N/cm

○ (practically available): 7.0 N/cm or more and less than 7.5 N/cm x (practically unavailable): less than 7.0 N/cm Evaluation of Chemical Resistance In order to examine the availability of the laminate of aluminum foil and CPP as a package material for lithium-ion batteries, which is one use form of the laminate, chemical resistance (hereinafter also referred to as "electrolyte resistance") was evaluated by an electrolyte test. The above laminates were each cut to a size of 100 mm×15 mm, and immersed in an electrolyte (prepared by adding lithium phosphate hexafluoride to ethylene carbonate/diethyl carbonate/dimethyl carbonate=1/1/1 (volume ratio)) at 85° C.

for 3 days. Thereafter, the laminate was taken out and washed with ion exchange water. Water was wiped off with a paper wiper, and moisture was sufficiently dried. Then, the laminate was cut to a size of 100 mm×15 mm, and chemical resistance was evaluated by a T-type peel test.

Evaluation Criteria

☆ (particularly practically excellent): 8.0 N/cm or more, or broken

◎ (practically excellent): 7.5 N/cm or more and less than 8.0 N/cm

○ (practically available): 7.0 N/cm or more and less than 7.5 N/cm

× (practically unavailable): less than 7.0 N/cm

INDUSTRIAL APPLICABILITY

The adhesive composition of the present invention comprises a modified polyolefin, epoxy resins, and an organic solvent, maintains excellent pot life, without undergoing thickening or gelation, after storage for a long period of time, and can satisfy excellent adhesion to both a metal substrate and a polyolefin resin substrate. Therefore, a laminated structure of a polyolefin resin substrate and a metal substrate formed using the adhesive composition of the present invention can be widely used not only in the field of home exterior panels, materials for furniture, members for building interiors, etc., but also as packaging materials (pouch forms) for lithium batteries used in personal computers, mobile phones, video cameras, etc.

The invention claimed is:

1. An adhesive composition comprising:
a modified polyolefin (A),
a glycidyl amine epoxy resin (B1),
a glycidyl ether epoxy resin (B2), and
an organic solvent (C);
wherein the modified polyolefin (A) is (A1) or (A2) below:
(A1): a crystalline acid-modified polyolefin having an acid value of 5 to 50 mg KOH/g-resin; or
(A2): an acid-modified chlorinated polyolefin having an acid value of 5 to 50 mg KOH/g-resin and a chlorine content of 5 to 40 mass %.

2. The adhesive composition according to claim 1, wherein the glycidyl amine epoxy resin (B1) is an epoxy resin having two or more glycidyl groups per molecule.

3. The adhesive composition according to claim 1, wherein the glycidyl amine epoxy resin (B1) is a compound represented by Formula (1):

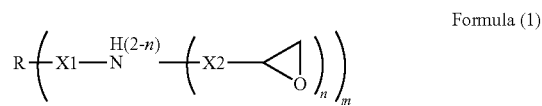

wherein in Formula (1), R is substituted or unsubstituted aryl group, X1 and X2 are independently substituted or unsubstituted $C_1$-$C_5$ alkylene group, m is 1 or 2, and n is 1 or 2.

4. The adhesive composition according to claim 1, wherein the glycidyl ether epoxy resin (B2) is an epoxy resin having two or more glycidyl groups per molecule and being free from nitrogen atom.

5. The adhesive composition according to claim 1, wherein the composition comprises 0.01 to 20 parts by mass of glycidyl amine epoxy resin (B1), 1 to 20 parts by mass of glycidyl ether epoxy resin (B2), and 80 to 1000 parts by mass of organic solvent (C), based on 100 parts by mass of modified polyolefin (A).

6. The adhesive composition according to claim 1, wherein the organic solvent (C) is a mixture of a solvent (C1) and a solvent (C2);
the solvent (C1) is one or more solvents selected from the group consisting of aromatic hydrocarbons, aliphatic hydrocarbons, alicyclic hydrocarbons, and halogenated hydrocarbons;
the solvent (C2) is one or more solvents selected from the group consisting of alcohol-based solvents, ketone-based solvents, ester-based solvents, and glycol ether-based solvents; and
the mass ratio of the solvent (C1) to the solvent (C2) is 50 to 97/50 to 3.

7. The adhesive composition according to claim 1, which is used for bonding between a polyolefin resin substrate and a metal substrate.

8. A laminate of a polyolefin resin substrate and a metal substrate bonded with the adhesive composition according to claim 1.

* * * * *